Figure 1:
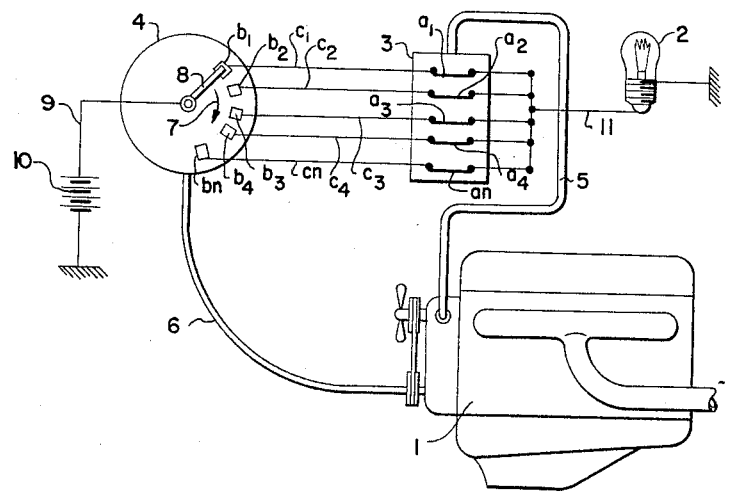

Oct. 4, 1966  H. GUTJAHR  3,277,441
OIL PRESSURE INDICATOR FOR INTERNAL COMBUSTION ENGINES
Filed Dec. 5, 1960

INVENTOR
HELMUT GUTJAHR

BY Dicke, Craig & Freudenberg
ATTORNEYS

United States Patent Office 3,277,441
Patented Oct. 4, 1966

3,277,441
OIL PRESSURE INDICATOR FOR INTERNAL COMBUSTION ENGINES
Helmut Gutjahr, Wendlingen am Neckar, Germany, assignor to Daimler-Benz Aktiengesellschaft, Stuttgart-Unterturkheim, Germany
Filed Dec. 5, 1960, Ser. No. 73,664
Claims priority, application Germany, Dec. 8, 1959, D 32,071
2 Claims. (Cl. 340—60)

The present invention relates to an indicating device for the oil pressure in the lubricating system, especially of motor-vehicle internal combustion engines, provided with a control light or warning light controlled in dependence on the oil pressure which lights up as a warning if a predetermined minimum oil pressure is not attained in the lubricating system.

The present invention essentially consists in connecting the control light with an oil-pressure stepping switch and to connect the latter with an engine-rotational-speed stepping switch. By the use of such an arrangement there is achieved, with relatively low expenditures and with only a single control lamp, a control of the magnitude of the lubricating oil pressure over the entire rotational speed range of the internal combustion engine whereby the control quality of the device depends exclusively on the number of utilized switching steps in the oil pressure switch and in the engine-rotational-speed switch.

According to a further feature in accordance with the present invention, the engine-rotational stepping switch may be constructed in the manner of an engine rotational speed measuring device, however, it may also be combined advantageously with an engine rotational speed measuring device. The oil-pressure stepping switch may consist of a membrane or diaphragm-type switch in which the individual contact steps are disposed one behind the other in the direction of pressure and in which an opening of each contact step takes place against the force exerted thereon by the spring coordinated to this contact step in addition to the pressure or force of the springs coordinated to all preceding contact steps.

Accordingly, it is an object of the present invention to provide an indicating installation for indicating the oil pressure, particularly for the lubricating system of internal combustion engines which is relatively simple in construction, accurate in function, and reliable in operation.

Another object of the present invention resides in the provision of an oil pressure indicator which makes possible, with simple means, to assure the maintenance of a minimum pressure in the lubricating system corresponding to the minimum necessitated by the prevailing engine rotational speed.

Still a further object of the present invention resides in the provision of an oil pressure indicator for internal combustion engines, especially internal combustion engines for motor vehicles, in which the oil pressure indicator is dependent for its operation on the prevailing oil pressure as well as engine rotational speed to provide its indicating function.

A still further object of the present invention resides in the provision of a simple, relatively inexpensive oil pressure indicator system in which a predetermined minimum oil pressure is coordinated to each engine rotational speed which has to prevail within the engine to prevent energization of the warning device.

Figure 2:
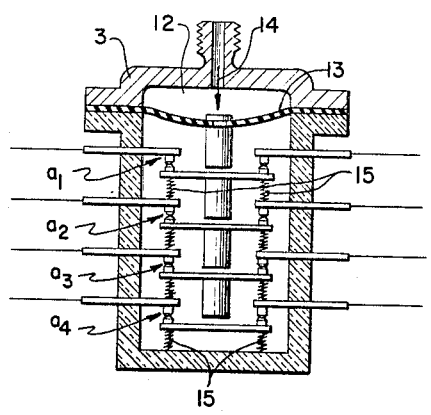

These and other objects, features and advantages of the present invention will become more obvious from the following description when taken in connection with the accompanying drawing which shows, for purposes of illustration only, one embodiment in accordance with the present invention, and wherein FIGURE 1 is a diagrammatic view of one embodiment of a pressure indicator system in accordance with the present invention, and FIGURE 2 is a longitudinal cross sectional view, on an enlarged scale, through an oil pressure stepping switch provided with four pressure steps in accordance with the present invention.

Referring now to the drawing wherein like reference numerals are used throughout the two views to designate corresponding parts, and more particularly to FIGURE 1, the indicator installation for the oil pressure in the lubricating system of the internal combustion engine, belonging, for instance, to a motor vehicle, essentially consists of a control light 2 arranged at a place in the vehicle which may be supervised by the driver, for example, at the dash board or instrument panel, of an oil-pressure stepping switch 3, and of a conventional engine-rotational-speed stepping switch 4. The oil pressure stepping switch 3 is in communication with the lubricating system of the internal combustion engine 1 through the pressure oil line 5 whereas the engine rotational speed stepping switch 4, which may have a construction essentially similar to a standard vehicle speedometer, is operatively connected with the crankshaft or the like of the internal combustion engine 1 by the drive shaft or rotating cable 6.

The contact steps are arranged within the oil-pressure-stepping switch 3 as pressure steps designated by reference characters $a_1$, $a_2$, $a_3$, $a_4$ to $a_n$ which respond in the indicated sequence to respective higher oil pressure. A similar number of steps, namely the contact steps $b_1$, $b_2$, $b_3$, $b_4$, to $b_n$ are provided within the engine-rotational-speed stepping switch 4. The contact steps $a_1$ to $a_n$ of the oil pressure switch 3 are connected with the contact steps $b_1$ to $b_n$ of the speed-responsive switch 4 by the electric lines $c_1$, $c_2$, $c_3$, $c_4$ to $c_n$. The sliding contact member 8 of the engine-rotational-speed stepping switch 4 which moves in the direction of arrow 7 with an increase in the engine rotational speed is electrically connected through line 9 with the source of electric power 10 such as a conventional battery or the like. The electric lines $c_1$ to $c_n$ are combined or connected together behind the oil-pressure stepping switch 3 into a single electric line 11 which leads to the control light 2.

A minimum oil pressure at the contacts $a_1$ to $a_n$ within the oil-pressure stepping switch 3 is coordinated to each engine rotational speed step and therewith to each contact step $b_1$ to $b_n$ within the engine rotational-speed-stepping switch 4. If, for example, the sliding contact 8 with a certain engine rotational speed rests on the contact step $b_3$, then the oil pressure in the lubricating system of the internal combustion engine has to be at least so large that the contact steps $a_3$ and therewith also the contact steps $a_1$ and $a_2$ within the oil pressure stepping switch 3 are opened in order that the supply of current to the control light 2 is interrupted between the electric lines $c_3$ and 11 and that the control light 2 is not lighted to produce a warning signal. If, however, the oil pressure in the lubricating system is smaller than the required or predetermined pressure, then the contact step $a_3$ remains closed and the control light 2 becomes operative to produce a warning signal by the light emitted therefrom.

FIGURE 2 illustrates the oil pressure stepping switch 3 of FIGURE 1 which is illustrated in FIGURE 2 as a diaphragm 13 in the direction of arrow 14 against the effect of the compression springs 15 coordinated to the four contact steps $a_1$ to $a_4$ indicated in this figure. In order to open, for example, the contact step $a_3$, the oil pressure has to be at least so large that it overcomes the force or pressure of the compression springs 15 which are coordinated to the contact step $a_3$, as well as the force or pressure of springs 15 which are coordinated to the contact step $a_1$ and $a_2$.

While I have shown and described one embodiment in accordance with the present invention it is understood that the same is not limited thereto but is susceptible of many changes and modifications within the spirit and scope thereof. For example, any suitable type of speed-responsive stepping switch of known construction may be used as stepping switch for the engine-rotational-speed stepping switch 4. In the alternative, a conventional stepping switch actuated by a speed-responsive means of known structure may be used in lieu thereof. The same is true, in an analogous manner, for the stepping switch 3 of the oil-pressure responsive switching device. Additionally, any suitable warning device or devices may be used for the lamp 2.

Thus, it is quite obvious that the present invention is susceptible of many changes and modifications without departing from the spirit thereof, and I, therefore, do not wish to be limited to the details shown and described herein but intend to cover all such changes and modifications as are encompassed by the scope of the appended claims.

I claim:

1. An indicating device for the oil pressure in the lubricating system of internal combustion engines and especially for motor vehicle internal combustion engines, comprising control light means operative to produce a warning light in dependence on the oil pressure, and means for energizing said control light means in the absence of a minimum oil pressure including an energizing circuit and oil pressure stepping switch means connected to said control light means for determining the value of oil pressure in said internal combustion engine, and engine-rotational speed stepping switch means connected to said energizing circuit and said stepping switch means for changing the minimum value of oil pressure at which energization of said control light means occurs in dependence upon the engine rotational speed, said oil-pressure stepping switch means being in the form of a membrane-type switch having a plurality of contact steps disposed one behind the other effectively in the direction of pressure, and spring means coordinated to each step for biasing said step so that an opening of each contact step takes place against the force of the spring means coordinated thereto in addition to the force exerted by the spring means of all preceding contact steps.

2. An indicating device for the oil pressure according to claim 1, wherein said engine-rotational-speed stepping switch means includes a speed measuring device.

References Cited by the Examiner
UNITED STATES PATENTS

| | | | |
|---|---|---|---|
| 2,814,796 | 11/1957 | Kozel | 340—263 |
| 2,931,011 | 3/1960 | Good | 340—52 |
| 2,957,160 | 10/1960 | Taganyi et al. | 340—52 |
| 3,119,991 | 1/1964 | Nallinger | 340—270 |

NEIL C. READ, *Primary Examiner.*

E. JAMES SAX, *Examiner.*

W. C. GLEICHMAN, A. H. WARING,
*Assistant Examiners.*